United States Patent [19]
Garcia et al.

[11] Patent Number: 6,043,770
[45] Date of Patent: Mar. 28, 2000

[54] STATISTICAL INFERENCE OF ELECTROMAGNETIC INTERFERENCE SOURCES BASED ON A PRIORI KNOWLEDGE OF SOURCE AND RECEIVER PARAMETERS

[75] Inventors: Joseph P. Garcia, Waldorf; Edgar A. Cohen, Jr., Columbia, both of Md.

[73] Assignee: The United States of America as represented by the Secretary of the Navy, Washington, D.C.

[21] Appl. No.: 09/176,932

[22] Filed: Oct. 23, 1998

[51] Int. Cl.$^7$ ........................................................ G01S 7/36
[52] U.S. Cl. ................................ 342/13; 342/16; 342/17; 342/59; 342/159; 342/162
[58] Field of Search .................................. 342/13, 16, 17, 342/18, 19, 59, 159, 162, 173, 195

[56] References Cited

U.S. PATENT DOCUMENTS

| | | | |
|---|---|---|---|
| 4,464,745 | 8/1984 | Rusch ........................................ | 370/206 |
| 4,486,757 | 12/1984 | Ghose et al. ............................. | 343/417 |
| 4,876,549 | 10/1989 | Masheff .................................... | 342/417 |
| 5,018,215 | 5/1991 | Nasr et al. ................................ | 382/155 |
| 5,262,789 | 11/1993 | Silverstein .............................. | 342/368 |
| 5,359,333 | 10/1994 | Withers, Jr. .............................. | 342/378 |

OTHER PUBLICATIONS

"Two–look method for roll correction of aircraft–borne interferometric SAR data", Bullock, R.J.; Voles, R.; Currie, A.; Griffiths, H.D.; Brennan, P., Radar Interferometry (Digest No.: 1997/153), IEE Colloquium on, 1997, pp. 2/1–2/6.

"Estimation and correction of roll errors in dual antenna interferometric SAR", Bullock, R.J.; Voles, R.; Currie, A.; Griffiths, H.D.; Brennan, P.V., Radar 97 (Conf. Publ. No. 449) ,1997, pp. 253–257.

"Inferring wind direction from the organization of mesoscale atmospheric signatures in RADARSAT imagery", Winstead, N.S.; Young, G.S.; Babin, S.M.., Geoscience and Remote Sensing Symposium Proceedings, 1998, IGARSS '98. 1998 IEEE International, vol. 2.

*Primary Examiner*—John B. Sotomayor
*Attorney, Agent, or Firm*—James B. Bechtel, Esq.; Robert A. Westerlund, Esq.; Raymond H. J. Powell, Jr., Esq.

[57] ABSTRACT

A transceiver system comprises transceivers and a controller in communication with the transceivers. Each of the transceivers comprises an emitter, a receiver operatively connected to the emitter, a primary data path operatively connected to the receiver, a secondary data path operatively connected to the receiver, a statistical unit operatively connected to the secondary data path and the controller and a display device operatively connected to the primary data path. The controller determines relative positions of the transceivers, and the statistical unit infers characteristics of the transceivers, forms a composite received signal model for all of the transceivers based on the relative positions and the characteristics, computes an electromagnetic interference likelihood value for a transceiver of the transceivers and identifies whether the transceiver is a source of electromagnetic interference by determining whether the electromagnetic interference likelihood value of the transceiver exceeds a threshold value.

14 Claims, 4 Drawing Sheets

STATISTICAL INFERENCE OF ELECTROMAGNETIC INTERFERENCE SOURCES BASED ON A PRIORI KNOWLEDGE OF SOURCE AND RECEIVER PARAMETERS

DESCRIPTION

BACKGROUND OF THE INVENTION

1. Field of the Invention

The present invention generally relates to inferring the sources of interference among multiple emitter and receiver platforms (e.g., multiple radar systems) in which certain parameters of the emitters and receivers are known a priori (e.g., deduced or presumed).

2. Description of the Related Art

Generally, a radar unit will include an emitter which transmits a signal having a specific frequency. The signal is reflected from objects (e.g., backscattering) to a receiver of the radar unit. The radar units also include a signal processing pathway which processes only the frequency transmitted by the emitter.

However, a problem arises with conventional systems. When two or more radar systems are physically close to one other and are operating at the same frequency, they may interfere with one other. For example, a mobile unit, such as a ship, may have several radars which could, because of their proximity, create difficulties in properly determining the nature of signals which they receive. Such phenomena often arise when two emitters from two different radar devices transmit signals of the same or similar frequency. In such a situation, each signal processing pathway might receive the signal transmitted by the other radar unit and misinterpret the received signal as backscattering. Similarly, each of the signal processing pathways could receive a combination of direct signal transmission from an adjacent emitter and backscattering, which may or may not be in phase with each other, resulting in an incorrect or unclear reception pattern.

In order to overcome such problems, conventional radar units can be combined into a larger radar system. Such a radar system would control each of the individual radar units to avoid having closely spaced radar units operating at the same frequency. For example, such a system would receive information regarding the position of all radar units within the given radar system and, if two radar units were within a predetermined distance from one another, the system would change the operating frequency of one or both radar units.

While such a conventional radar system avoids direct interference, there is still interference among radar units which are not as closely spaced and among radar units which are operating at different, but relatively close, frequencies.

Also, there may be enemy traffic in the vicinity attempting to defeat transmission of information by purposely introducing noise into the signals of interest. Such jamming effects are especially troublesome, and statistical methods are needed to ascertain the sources of such intentional noise in addition to the sources unintentionally introducing spurious information.

SUMMARY OF THE INVENTION

It is, therefore, an object of the present invention to provide a structure and method for statistically inferring the sources of electromagnetic interference of a radar unit, assuming certain parameters of the sources and receivers of other radar units. The statistical information is derived from a separate signal processing pathway which has a wider frequency bandwidth than that normally used by the radar unit for a reflected image.

The invention includes a transceiver system comprising transceivers and a controller in communication with the transceivers. Each of the transceivers comprises an emitter, a receiver operatively connected to the emitter, a primary data path operatively connected to the receiver, a secondary data path operatively connected to the receiver, a statistical unit operatively connected to the secondary data path and the controller, and a display device operatively connected to the primary data path.

The controller determines relative positions of the transceivers, and the statistical unit infers characteristics of the transceivers, forms a composite received signal model for all of the transceivers based on the relative positions and the characteristics, computes an electromagnetic interference likelihood value for a given transceiver of the transceivers and identifies whether the transceiver is a source of electromagnetic interference by determining whether the electromagnetic interference likelihood value of the transceiver exceeds a threshold value.

The statistical unit statistically analyzes the characteristics. The statistical unit predicts a pointing direction of the emitter of each of the transceivers and predicts rotation rates of the emitter of each of the transceivers. The statistical unit determines the electromagnetic interference likelihood value based on periodic updates from the receiver.

More specifically, in a first aspect, the invention uses tracking theory methods to predict, as a function of time, the emitter platform positions and their radar pointing directions and angular velocities relative to the receiving platform. Radar receiver pointing directions and angular rates as functions of time are assumed known, as they are controlled by personnel aboard the receiving ship. Then, having obtained estimates of all of these emitter positioning radar directions and radar angular rates, the inventive system utilizes an innovative statistical methodology to ascertain the most likely sources of electromagnetic interference (EMI). This is done by building a model of the composite signal from all of the emitters, be they EMI sources or not, and then devising a likelihood ratio test for determining EMI sources, subject to a reasonable bound on the false alarm probability. Statistical information obtained from the tracking model is used in forming the likelihood ration, and once the ration exceeds a threshold value determined by the bound on false alarm rate, the relevant emitter is declared to be an EMI source.

The emphasis of the methodology is that of determining the dominant sources of EMI, and such dominant sources should be reflected in the fact that once they are eliminated from the composite signal formed from all emitter sources, the resulting signal should have the property that the tracking estimates correlate well with the receiver video.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
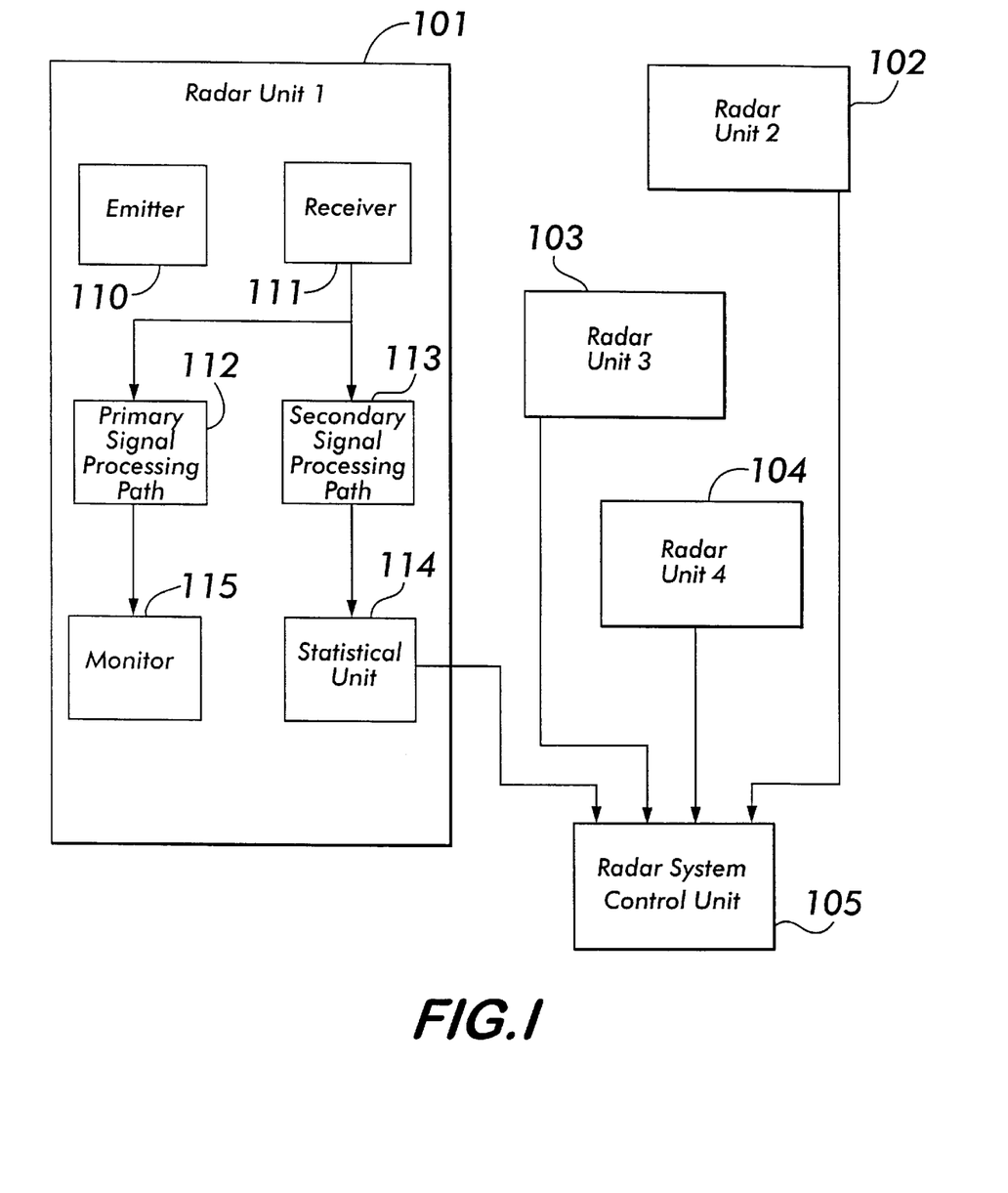
FIG. 1 is a block diagram illustrating a preferred embodiment of the invention.

Referring now to the drawings, and more particularly to FIG. 1, a preferred embodiment of the invention is illustrated. More specifically, radar units 1–4 (101–104) are in communication with a radar system control unit 105.

Each of the radar units includes the following components: an emitter 110, a receiver 111, a primary data path 112, a secondary data path 113, a statistical unit 114, and a display device 115.

As discussed above, if closely spaced radar units operate at the same frequency, they may interfere with one another. In real world applications, there may be many radar units operating at various distances from one another and at the same or closely spaced frequencies. The present invention includes a secondary signal processing pathway 113 that looks at a broad bandwidth and statistically analyzes such information to determine which radar units, if any, are interfering with a given radar unit.

More specifically, as illustrated in FIG. 1, each radar unit of the invention includes, in addition to the primary signal processing path 112, a separate secondary signal processing pathway 113. The primary signal processing pathway 112 filters all signals other than those having a frequency equal to that broadcast by the emitter 110. The primary signal processing pathway limits the signals forwarded to the monitor 115 in such a way to provide the best resolution possible (e.g., to eliminate unrelated signals).

On the contrary, the secondary signal processing pathway 113 evaluates a broader bandwidth than that normally evaluated by a radar transceiver. In doing so, the secondary signal processing pathway gathers information relating to the frequency of the signal transmitted by the emitter 110 and frequencies above and below that transmitted by the emitter 110.

The statistical unit 114 performs a statistical analysis of the signals gathered by the secondary signal processing pathway 113 and estimates which other emitters of different radar units could be causing interference. The statistical unit 114 makes estimations regarding the transmission characteristics of the different radar units based on standardized features shared by most present day radar units.

For example, the statistical unit 115 incorporates information regarding the pointing directions of the other radar emitters and the shapes and sizes of the lobes of the other radar units.

The frequency bandwidth which may be processed by the secondary signal processing pathway may be broad enough to receive data from all possible radar emitters or may be limited to a narrower bandwidth.

For emitters and receivers, knowing (to some degree of accuracy) the antenna lobe patterns, the instantaneous pointing directions, the antenna rotation rates and the respective geo-locations of all platforms, it is possible to make educated presumptions of the details of a particular platform containing an electromagnetic interference source.

Figure 2:
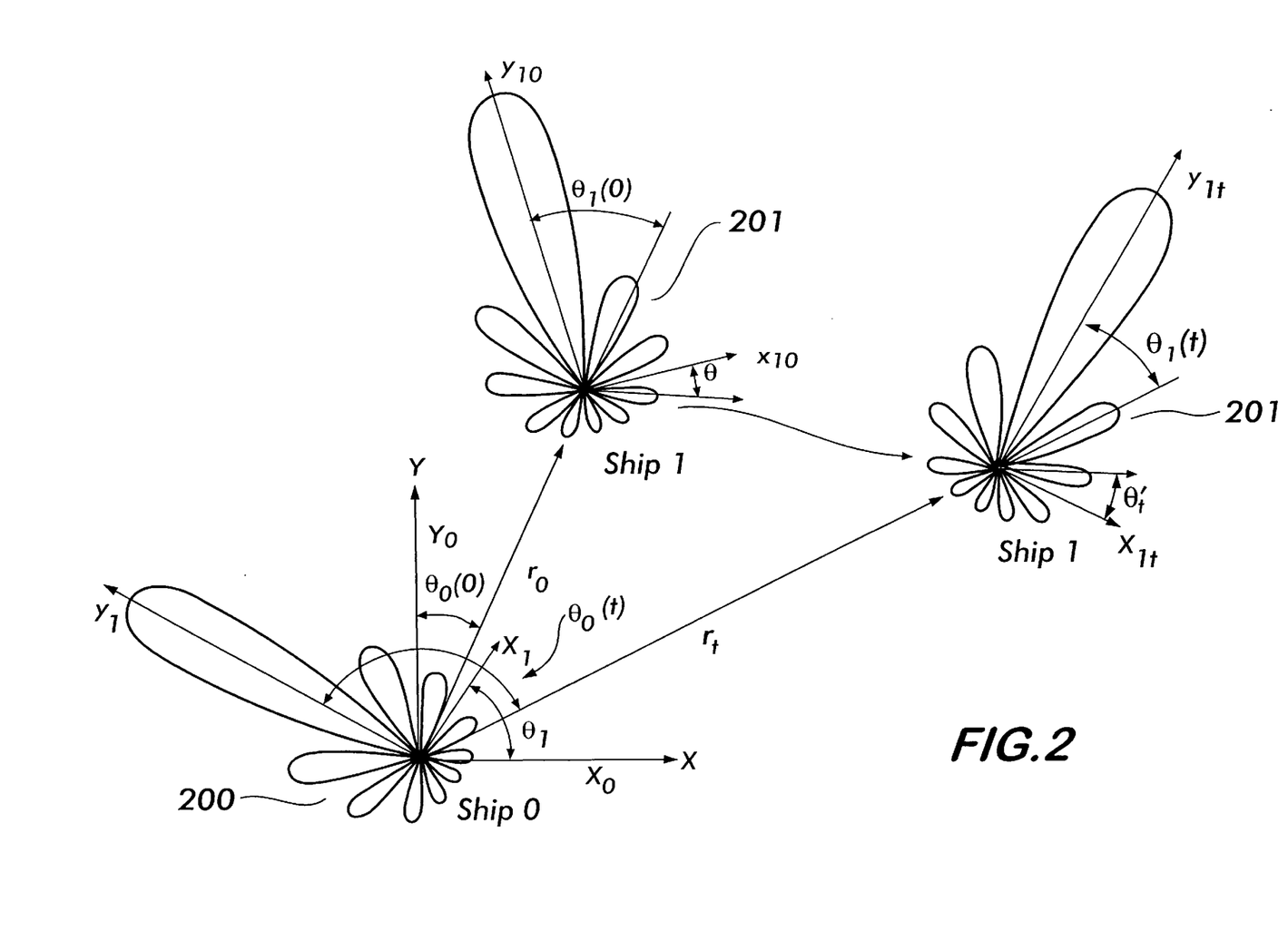
FIG. 2 is a perspective illustration showing the information used in the statistical calculation of the invention.

For example, in FIG. 2, two antennas are illustrated. One antenna 200, located on ship 0, one's own ship, rotates nominally with an angular rate $\omega$ and another antenna 201, located on some other ship, ship 1, rotates nominally with an angular rate $\omega_1$.

As shown in FIG. 2, ship 1 is initially separated from ship 0 by a vector $r_0$. In addition, there are two moving coordinate frames, xy and $x_1 y_1$, the first coordinate frame xy moving with ship 0 in such fashion that the y axis lies along the main antenna lobe of ship 0 as time evolves. The second coordinate frame moves in like fashion for ship 1.

Lastly, a standard, or fiducial, frame XY is assigned to ship 0 and has a permanently fixed orientation. The fiducial frame XY orientation is such the Y is initially aligned with the main antenna lobe for ship 0.

One may expand the position vector about time 0 into a Maclaurin series, namely, $$r(t) = r(0) + \dot{r}(0)t + \ddot{r}(0)\frac{t^2}{2!} + \ldots \qquad (1)$$

for any position vector which varies with an appropriate degree of smoothness. Of course, in a statistical sense, Equation (1) could be considered a realization of a random process.

In FIG. 2, the plane of the paper is considered to be that of the ocean surface and each antenna is rotating about a vertical axis which is directed out of the paper. At any given time t, let i, j, and k be standard basis vectors for the rotating coordinate system of ship 0. In a similar manner, let $i_1$, $j_1$, and $k_1$ be standard basis vectors for the rotating coordinate system of ship 1.

Two angles, namely, $\theta_0(t)$ and $\theta_1(t)$, should be determined as functions of time to locate the emitter. The angle $\theta_0(t)$ is the angle between the main lobe direction for ship 0 and the position vector between the two ships, and the latter is the angle between the main lobe direction for ship 1 and the position vector between the two ships. From vector analysis, it is known that $$\begin{cases} i_{r_t} x j = (\sin\theta_0(t)) \\ i_{r_t} x j_1 = (\sin\theta_1(t))k \end{cases} \qquad (2)$$

where $i_r$ is a unit vector in the direction $r_t$. From Equation (2) it follows that $$\begin{cases} (i_{r_t} x j) \cdot k = \sin\theta_0(t) \\ (i_{r_t} x j_1) \cdot k = \sin\theta_1(t) \end{cases} \qquad (3)$$

The unit vectors can be represented in terms of the absolute unit basis vectors $i_X$ and $j_Y$ of the XY system. One has, for example, $$i = (\cos\theta_t)i_X + (\sin\theta_t)j_Y \qquad (4)$$

$$j = (-\sin\theta_t)i_X + (\cos\theta_t)j_Y,$$

where $\theta_t$ is the angle between the $x_t$ and X axes, as shown in FIG. 1. In general, $\theta_t$ may be expanded into a Maclaurin series, namely, $$\theta_t = \dot{\theta}_0 t + \ddot{\theta}_0 \frac{t^2}{2!} + \dddot{\theta}_0 \frac{t^3}{3!} + \ldots \qquad (5)$$

When the angular rate is constant, one has the special case $$\theta_t = \omega t. \qquad (6)$$

When the velocity of ship 1 relative to ship 0 is constant, Equation (1) reduces to $$r(t) = r(0) + vt. \qquad (7)$$

Given that (6) and (7) are correct, $$i_{r_t} = \frac{r_t}{\|r_t\|} = \frac{(r_X(0) + v_X t)i_X + (r_Y(0) + v_Y t)j_Y}{\sqrt{r_0^2 + 2(r_X(0)v_X + r_Y(0)v_Y)t + v^2 t^2}}, \quad (8)$$

the representation in the XY-coordinate frame. If $\theta_t^{1i}$ is the angle between the $x_{1t}$ axis and the X direction, $$\theta_t' = \theta_X + \theta_0' t + \theta_t'' \frac{t^2}{2!} + \ldots \quad (9)$$

When the angular rate $\omega_1$ is constant, Equation (9) reduces to $$\theta_t' = \theta_X + \omega_1 t. \quad (10)$$

Furthermore, in view of Equation (10), $$i_1 = \cos(\theta_X + \omega_1 t)i_X + \sin(\theta_X + \omega_1 t)j_Y$$

$$j_1 = -\sin(\theta_X + \omega_1 t)i_X + \cos(\theta_X + \omega_1 t)j_Y. \quad (11)$$

From Equations (4b) and (6), it can be seen that $$i_X \times j = (\cos\theta_t)k = (\cos\omega t)k \quad (12a)$$

and $$j_Y \times j = (\sin\omega t)k. \quad (12b)$$

Therefore, Equation (3a) becomes $$\sin\theta_0(t) = \frac{(r_X(0) + v_x t)\cos\omega t + (r_Y(0) + v_Y t)\sin\omega t}{\sqrt{r_0^2 + 2(r_X(0)v_X + r_Y(0)v_Y)t + v^2 t^2}}. \quad (13)$$

From Equation (11b), it follows that $$i_X \times j_1 = \cos(\theta_x + \omega_1 t)k$$

$$j_Y \times j_1 = \sin(\theta_x + \omega_1 t)k. \quad (14)$$

Thus, Equation (3b) is $$\sin\theta_1(t) = \frac{(r_X(0) + v_x t)\cos(\theta_X + \omega_1 t) + (r_Y(0) + v_Y t)\sin(\theta_X + \omega_1 t)}{\sqrt{r_0^2 + 2(r_X(0)v_X + r_Y(0)v_Y)t + v^2 t^2}}. \quad (15)$$

Now, based on standard theory given by Toomay, J. C., *Radar Principles for the Non-Specialist,* Lifetime Learning Publications, Belmont, Calif., 1982, pp. 18–21, an ideal gain for an antenna with aperture a receiving a pure tone signal with wavelength $\lambda$ is $$G(\omega, r_t, t) = \frac{\sin\left(\frac{\pi a}{\lambda}\sin\theta_0(t)\right)}{\frac{\pi a}{\lambda}\sin\theta_0(t)}, \quad (16)$$

provided that $|\theta_0(t)| \leq \pi/2$. When $|\theta_0(t)| > \pi/2$, let us assume that the gain is given by a reflected pattern $G_R(\omega, r_t, t) = AG(\omega, r_t, t)$, an attempted version of (16), $A \leq 1$ being an attenuation factor. This reflected pattern is assumed to be due to diffraction phenomena and is not an artifact of geometrical optics. To determine when Equation (16) is or is not to be used, the magnitude of $\theta_0(t)$ must be determined. Therefore $\cos\theta_0(t)$ must be determined. Now $$i_{r_t} \cdot j = \cos\theta_0(t) = \frac{r_X(t)(i_X \cdot j) + r_Y(t)(j_Y \cdot j)}{r_t}, \quad (17)$$

where $r_t = \|r_t\|$. From Equation (4b), we have $$i_X \cdot j = -\sin\theta_t = -\sin\omega t$$

$$j_Y \cdot j = \cos\theta_t = \cos\omega t \quad (18)$$

Thus Equation (17) becomes $$\cos\theta_0(t) = \frac{-r_X(t)\sin\omega t + r_Y(t)\cos\omega t}{r_t}. \quad (19)$$

Equations (13) and (19) could be used in order to find the magnitude of $\theta_0(t)$. However, it is sufficient to know whether or not $|\theta_0(t)| \leq \pi/2$. If the right side of Equation (19) is nonnegative, G is used. If, on the other hand, the right side is negative, $G_R$ is used. In the sequel, the subscript R will be dropped. Similarly, the transmitted gain for an antenna with aperture $a_1$ is $$A(r_t, \omega_1, \theta_X, t) = \frac{\sin\left(\frac{\pi a_1}{\lambda}\sin\theta_1(t)\right)}{r_t^2 \frac{\pi a_1}{\lambda}\sin\theta_1(t)}, \quad (20)$$

provided that $|\theta_1(t)| > \pi/2$, so that the transmitting antenna points toward the receiving ship. Using Equations (8) and (11b), it follows that $$\cos\theta_1(t) = i_{r_t} \cdot j_1 = \frac{-r_X(t)\sin(\theta_X + \omega_1 t) + r_Y(t)\cos(\theta_X + \omega_1 t)}{r_t}. \quad (21)$$

When $\cos\theta_1(t) < 0$ (so that $|\theta_1(t)| > \pi/2$), Equation (20) is used. If not, an attenuated version of Equation (20) is used. The product GA (from Equations 16 and 20 and their reflected versions) modulates a signal x emitted by ship 1, and the product GAx, or a lightly modified form of it accounting for "phase jitter," is to be used in the ensuing statistical analysis.

Having determined the appropriate geometrical relationships governing the scenario of FIG. 2 and having thereby obtained both the emitter and receiver gains as functions of the basic parameters $\omega$, $r_t$, $\omega_1$, and $\theta_x$, the invention next ascertains the transmitting ship position relative to the receiving ship and the transmitting antenna main lobe orientation $\theta_1(t)$. The antenna apertures a and $a_1$ and the wavelength $\lambda$ of the signal are assumed to be known. Since it is assumed that the transmitting ship is moving with a relatively constant velocity over the time period of interest, it is appropriate to use a steady-state filter as a tracking tool. Thus, the well-known $\alpha,\beta$ filter is invoked.

As indicated in FIG. 2, there is an initial angular orientation $\theta_x$ of the main lobe of the emitter's antenna relative to ship 0's X axis. This angle appears in Equation (21) and must be accounted for in some manner. If there is no prior information concerning its value, it may be assumed that it is uniformly distributed over $(-\pi,\pi)$. Of course, any distribution that is dictated by a better understanding of its value could be used instead. For purposes of the invention it is assumed that $\theta_x$ is uniformly distributed.

All r vectors will be related to the fiducial XY frame of reference. In the simplest case, it can be assumed that the position vector and antenna orientation of the antenna aboard ship 1 are independent Gaussian random quantities trackable using a standard model for a constant velocity target undergoing slight changes in velocity in tandem with a constant angular rate model undergoing small changes in that rate.

The appropriate $\alpha,\beta$ filters are represented in mathematical terms below. First of all, the positions vectors are expressed in terms of (X,Y) coordinate by $r(t)=(X(t),Y(t))'$. It is assumed that $r(t)$, for any given t, is a Gaussian random vector with independent components. Then, if T is the sampling interval, the dynamical system for $r(t)$ in discrete form is $$s((k+1)T)=Fs(kT)+v(k), k \geq 0, \tag{22}$$

where $$F = \begin{bmatrix} \begin{pmatrix} 1 & T \\ 0 & 1 \end{pmatrix} & 0 \\ 0 & \begin{pmatrix} 1 & T \\ 0 & 1 \end{pmatrix} \end{bmatrix}, \tag{23}$$

a direct sum of 2 by 2 matrices and $s(t)=(t),\dot{X}(t),Y(t),\dot{Y}(t)$. The vector $v(k)$ is a zero-mean, Gaussian white-noise sequence with constant covariance matrix $$Q = \begin{bmatrix} \begin{pmatrix} \frac{1}{3}T^3 & \frac{1}{2}T^2 \\ \frac{1}{2}T^2 & T \end{pmatrix} q_1 & 0 \\ 0 & \begin{pmatrix} \frac{1}{3}T^3 & \frac{1}{2}T^2 \\ \frac{1}{2}T^2 & T \end{pmatrix} q_2 \end{bmatrix}, \tag{24}$$

where $q_1,q_2>0$ are given constants. Thus, $E(v(k)v'(j))=Q\delta_{kj}$, E being the expectation operator and $\delta_{kj}$ being the Kronecker delta function. Together with Equation (22), the following measurement equation is produced, assuming that only position measurements are available:

$$z(k)=Hs(k)+w(k), \tag{25}$$

where $$H = \begin{bmatrix} 1000 \\ 0010 \end{bmatrix}$$

and $w(k)$ is zero-mean Gaussian with $$E(w(k)w'(j)) = \begin{pmatrix} \sigma_{w_1}^2 & 0 \\ 0 & \sigma_{w_2}^2 \end{pmatrix} \delta_{kj}.$$

The state estimate is then given by $$\hat{s}(k+1|k+1) = \hat{s}(k+1|k) + \begin{bmatrix} \alpha_1 & 0 \\ \beta_1/T & 0 \\ 0 & \alpha_2 \\ 0 & \beta_2/T \end{bmatrix} [z(k+1) - \hat{z}(k+1|k)]. \tag{26}$$

The $\alpha,\beta$ values are given by Bar-Shalom and Fortmann (*Tracking and Data Association*, Academic Press, Inc., Boston, 1988, Ch. 2) through the pair of equations $$\frac{\beta_i^2}{1-\alpha_i} = \frac{T^3 q_i}{\sigma_{w_i}^2} \equiv \mu_i^2 \tag{27a}$$

$$\frac{\beta_i^2}{1-\sqrt{2\beta_i + \beta_i^2/12} + \frac{1}{2}\beta_i} = \mu_i^2, i = 1, 2. \tag{27b}$$

Equation (27b) needs to be solved numerically. The covariance for the state estimate $\hat{s}(k|k)$, again appealing to Bar-Shalom and Fortmann, is give by the constant matrix $$C(k|k) = \tag{28}$$

$$\begin{bmatrix} \alpha_1 \sigma_{w_1}^2 & \frac{\beta_1}{T}\sigma_{w_1}^2 & & \\ \frac{\beta_1}{T}\sigma_{w_1}^2 & \frac{\beta_1}{T^2}\frac{(\alpha_1 - \beta_1/2)}{(1-\alpha_1)}\sigma_{w_1}^2 & & 0 \\ & & \alpha_2 \sigma_{w_2}^2 & \frac{\beta_2}{T}\sigma_{w_2}^2 \\ & 0 & \frac{\beta_2}{T}\sigma_{w_2}^2 & \frac{\beta_2}{T^2}\frac{(\alpha_2 - \beta_2/2)}{(1-\alpha_2)}\sigma_{w_2}^2 \end{bmatrix}$$

Finally, an $\alpha,\beta$ filter is needed for antenna orientation. The following 2 by 2 system of equations can be utilized $$s_1((k+1)T)=F_1 s_1(kT)+v_1(k), \tag{29}$$

where $$F_1 = \begin{pmatrix} 1 & T \\ 0 & 1 \end{pmatrix}, \tag{30}$$

$s_1(t)=(\theta(t),\omega(t))$, and $v_1(k)$ is Gaussian with 0 mean and constant covariance $$Q_1 = \begin{pmatrix} \frac{1}{3}T^3 & \frac{1}{2}T^2 \\ \frac{1}{2}T^2 & T \end{pmatrix} q_3. \tag{31}$$

Corresponding to Equation (25), $$z_1(k)=H_1 s_1(k)+w_3(k), \tag{32}$$

where $H_1=(1,0)$ and $w_1(k)$ is zero-mean Gaussian with $$E(w_3(k)w_3(j)) = \sigma_{w_3}^2 \delta_{kj}. \tag{33}$$

To simplify the analysis, $\theta(t)$ is replaced by $$\theta^*(t)=\theta(t)-\theta_X, \tag{34}$$

so that $\theta^*(0)=0$. In that way, $\theta^*(t)$ and $\theta_X$, the initial offset, are treated as independent random variables. Thus, $s_1(t)=(\theta^*(t),\omega(t))$. Hereafter $\theta(t)$ is treated as $\theta^*(t)$, i.e., the asterisk is dropped. For $s_1$, there exists a state estimation equation parallel to Equation (22), the gain matrix being $(\alpha_3, \beta_3/T)'$. Quantities $\alpha_3$ and $\beta_3$ are obtainable by solving Equation (27a) and Equation (27b) for i=3. The covariance matrix of interest is $$C_1(k|k) = \begin{pmatrix} \alpha_3 \sigma_{w_3}^2 & \frac{\beta_3}{T}\sigma_{w_3}^2 \\ \frac{\beta_3}{T}\sigma_{w_3}^2 & \frac{\beta_3(\alpha_3-\beta_3/2)}{T^2(1-\alpha_3)}\sigma_{w_3}^2 \end{pmatrix}, \tag{35}$$

and the state estimate module is $$\hat{s}_1(k+1|k+1) = \hat{s}_1(k+1|k) + \begin{pmatrix} \alpha_3 \\ \beta_3/T \end{pmatrix}(z_3(k+1)-\hat{z}_3(k+1|k)). \tag{36}$$

Equations (13) and (15) are now presented in a slightly different way, which will be useful in the ensuing analysis. For example, if $\sin\theta_0(kT)$ is to be evaluated, then Equation (13) is just $$\sin\theta_0(kT) = \frac{X(kT)\cos\omega kT + Y(kT)\cos\omega kT}{r(kT)} \tag{37}$$

where $$r(kT) = \sqrt{X^2(kT) + Y^2(kT)}.$$

Now, $$X(kT)=\hat{X}(k|k)+e_1(k)$$
$$Y(kT)=\hat{Y}(k|k)+e_2(k), \tag{38}$$

where $\hat{X}(k|k)$ and $\hat{Y}(k|k)$ are obtainable using Equations (22), (25) and (26). In fact, from Equation (26), $$\hat{X}(k|k)=\hat{X}(k|k-1)+\alpha_1(z_1(k)-\hat{z}_1(k|k-1)), \tag{39}$$

where $z_1(k)$ is the measurement of X at time kT and $\hat{z}_1(k|k-1)$ is the estimate of X at time kT projected from time $(k-1)T$. Thus, $\hat{z}_1(k|k-1)=\hat{X}(k|k-1)$, and, using this fact in Equation (39), $$\hat{X}(k|k)=\alpha_1 z_1(k)+(1-\alpha_1)\hat{X}(k|k-1), \tag{40}$$

a convex combination of the predicted measurement at time kT and the measurement itself. Now, from Equation (22), $$\hat{X}(k|k-1)=\hat{X}(k-1|k-1)+T\hat{X}'(k-1|k-1), \tag{41}$$

a simple recursion. Given $\hat{X}(0|0)$ and $\hat{X}'(0,0)$, Equation (41) can be computed for any k, provided that $\hat{X}'(k|k)$ is known. But, from Equation (26), $$\hat{X}'(k|k) = \hat{X}'(k|k-1) + \frac{\beta_1}{T}(z_1(k)-\hat{z}_1(k|k-1)) \tag{41a}$$

$$= \hat{X}'(k|k-1) + \frac{\beta_1}{T}(z_1(k)-\hat{X}(k|k-1)),$$

where $\hat{X}'(k|k-1)=\hat{X}'(k-1|k-1)$. So the recursion is justified. Similarly, $$\hat{Y}(k|k)=\alpha_2 z_2(k)+(1-\alpha_2)\hat{Y}(k|k-1), \tag{42}$$

where $$\hat{Y}(k|k-1)=\hat{Y}(k-1|k-1)+T\hat{Y}'(k-1|k-1). \tag{43}$$

The above relations may be used in Equation (38). Observe that the errors $e_1$ and $e_2$ are Gaussian with mean 0 and variance $\alpha_1\sigma_{w_1}^2$ and $\alpha_2\sigma_{w_2}^2$, respectively, as seen from Equation (28). Next, using Equation (15), it is possible to obtain $\sin\theta_1(kT)$. One has $$\sin\theta_1(kT) = \frac{X(kT)\cos(\theta_X+\theta(kT)) + Y(kT)\sin(\theta_X+\theta(kT))}{r(kT)}. \tag{44}$$

Note that, in Equation (44), as opposed to Equation (15), a constant angular rate is not necessarily assumed. Now $$\theta(kT)=\hat{\theta}(k|k)+e_3(k), \tag{45}$$

where $\hat{\theta}(k|k)$ is obtainable from Equation (36). In fact, $$\hat{\theta}(k|k)=\alpha_3 z_3(k)+(1-\alpha_3)\hat{\theta}(k|k-1), \tag{46}$$

with $$\hat{\theta}(k|k-1)=\hat{\theta}(k-1|k-1)+T\hat{\theta}'(k-1|k-1). \tag{47}$$

As before, a parallel recursive scheme is needed for $\hat{\theta}'(k|k)$. It is, of course, obtainable through Equation (36). In fact, $$\hat{\theta}'(k|k) = \hat{\theta}'(k|k-1) = \frac{\beta_3}{T}(z_3(k)-\hat{z}_3(k|k-1), \tag{48}$$

with $\hat{z}_3(k|k-1)=\hat{\theta}(k|k-1)$. The statistics for the error $e_3(k)$ are provided through the covariance matrix $C_1$ given by Equation (35).

Having determined state estimates for the ship emitter platform position and the angle $\theta(t)$ between the $x_1$ axis and the X axis, apart from the offset $\theta_X$, a composite received signal model can now be formed and its first two moments can be found. The quantity $a_j(t)$ is the product of the receiver gain and the emitter gain for any ship j, and $s_j(t)$ is a known transmitted waveform for emitter j. Then the signal ideally received would be $a_j(t) s_j(t)$ at any given time t. If there are NE emitters altogether, be they EMI sources or not, then the actual received signal could be modeled as $$y_{REC}(t) = \sum_{j=1}^{NE} a_j(t)s_j(t) + n(t), \tag{49}$$

where n(t) is an ambient white-noise source (due to atmospheric and other effects) which is not correlated with the sum. It is assumed that the noise power $E(n^2(t))=\sigma_n^2$ is known. Then the mean and variance of $y_{REC}(t)$ at $t=kT$ can be found. First of all, the expected value is given by $$m(kT) = E(y_{REC}(kT)) = \sum_{j=1}^{NE} s_j(kT)E(a_j(kT)). \tag{50}$$

Now, assuming that $\theta_x$ is uniformly distributed on $(-\pi,\pi)$, $$E(a_j(kT)) = \tag{51}$$

$$\frac{1}{2\pi}\int_{-\pi}^{\pi}\int_{-\infty}^{\infty}\int_{-\infty}^{\infty}\int_{-\infty}^{\infty} a_j(kT)p_1(e_1)p_2(e_2)p_3(e_3)de_1 de_2 de_3 d\theta_x,$$

where, using Equations (28) and (35), $$p_i(e_i) = \frac{1}{\sqrt{2\pi\alpha_i\sigma_{w_i}^2}}e^{-(e_i^2/2\alpha_i\sigma_{w_i}^2)}, 1 \leq i \leq 3. \tag{52}$$

In Equation (52), of course, the $\alpha_i$ and $\sigma_{w_i}^2$ values could vary from one emitter source to another. Also, the expected value of the square of the received signal is needed in order to determine its variance. Thus, $$E(y_{REC}^2(kT)) = \sum_{j=1}^{NE}\sum_{j'=1}^{NE} s_j(kT)s_{j'}(kT)E(a_j(kT)a_{j'}(kT)) + \sigma_n^2 \tag{53}$$

$$= \sum_{j=1}^{NE} s_j^2(kT)E(a_j^2(kT)) +$$

$$2\sum_{1\leq j<j'\leq NE} s_j(kT)s_{j'}(kT)E(a_j(kT)a_{j'}(kT)) + \sigma_n^2.$$

The only quantities in (53) which have not yet been determined are the expectations of the square of the gain products. These are obtainable by computing a multiple integral of the same form as Equation (51) except for the replacement of $a_j(kT)$ by its square, having such quantities available, the variance of $y_{REC}(kT)$ is obtained as $$\sigma_{REC}^2 = \sigma^2(y_{REC}(kT)) = E(y_{REC}^2)(kT) - (E(y_{REC}(kT)))^2. \tag{54}$$

Integrals such as that shown in Equation (51) could be computed by using Gauss-Hermite quadrature formulas (e.g., see Davis, Philip J., *Interpolation and Approximation*, Blaisdell, N.Y., 1963, Ch. 14).

Having determined the mean and variance of $y_{REC}(kT)$, its density can be computed under a Gaussian assumption as $$pden(kT) = \frac{1}{\sqrt{2\pi\sigma_{REC}^2}}e^{-(y_{REC}(kT)-m(kT))^2/2\sigma_{REC}^2}. \tag{55}$$

Now that all of these calculations have been performed, it must be determined if a certain ship or emitter $j_0$ is an emitter of EMI. In order to assess this possibility, let us deduct its effect from the composite given in Equation (49) and recompute (50) and (54) on that basis. The results so obtained lead to a new density parallel to that given by Equation (55). This new density is identified by $pden_1(kT)$. The following likelihood ratio is now formed:

$$LR(kT) = \frac{pden_1(kT)}{pden(kT)}, \tag{56}$$

and a decision as to whether or not emitter $j_0$ is a dominant EMI source at time kT is made on the basis of whether or not LR(kT) exceeds a certain threshold value, denoted by THR. To determine THR, the probability of alleging that emitter $j_0$ is a meaningful contributor to EMI when it is not is to be bounded by a small quantity $\epsilon$, i.e., a value $y_{CR}$ is located such that $$\int_{y_{CR}}^{\infty} pden(y)dy \leq \epsilon, \tag{57}$$

where pden(y) is given by (55) once $y_{REC}(kT)$ is replaced by y, m(kT) and $\sigma^2_{REC}$ remaining the same, since they are the mean and variance appropriate at time $t=kT$ for the original mix. The threshold THR is now obtained by substituting $y_{CR}$ for $y_{REC}(kT)$ in the likelihood ratio. If LR(kT) exceeds THR, a possible source of EMI is declared.

The procedure outlined above works well when there is a priori knowledge of just one dominant EMI source, since a major effect should occur when the right source is deleted from the model mix. If it is known that there are two EMI sources, the invention changes Equation (49) by deducting pairs of emitter effects from the mix and thence looking at a likelihood ratio paralleling Equation (56). In this manner, feasible EMI source pairs are procured. Further, by monitoring such effects in time, it is much more likely that EMI sources will be ascertained, especially if there are significant time-varying effects due to the disturbance.

In summary, the inventive system uses tracking theory methods to predict the emitter positions, emitter pointing directions, and emitter rotation rates based on periodic updates from the separate signal processing pathway. The inventive system also utilizes the foregoing statistical techniques, based on a correlation of tracking theory methods with receiver video, for the purposes of inferring the possible electromagnetic interference sources.

Figure 3A:
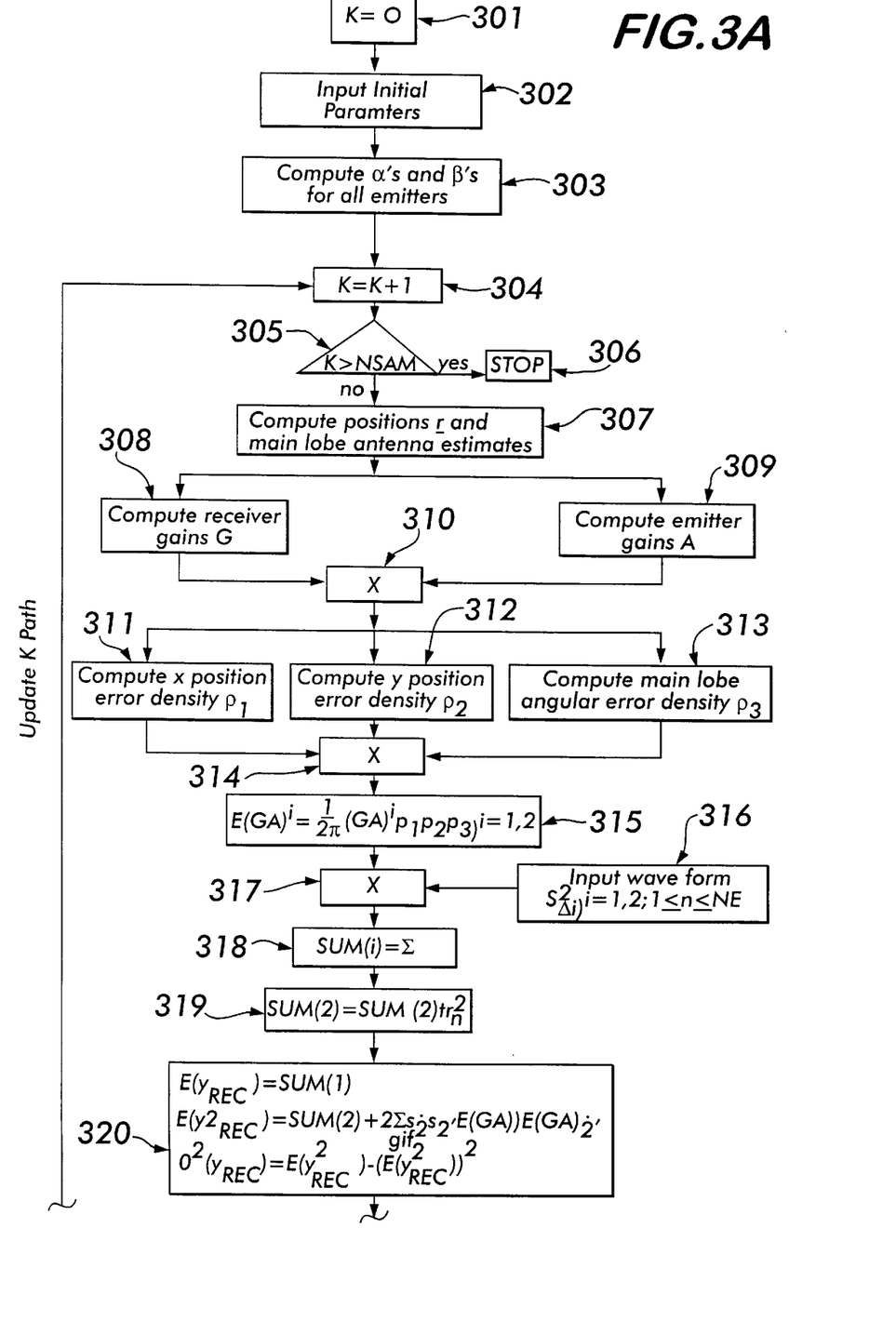
FIGS. 3a and 3b are a flowchart illustrating a preferred embodiment of the invention.
Figure 3B:
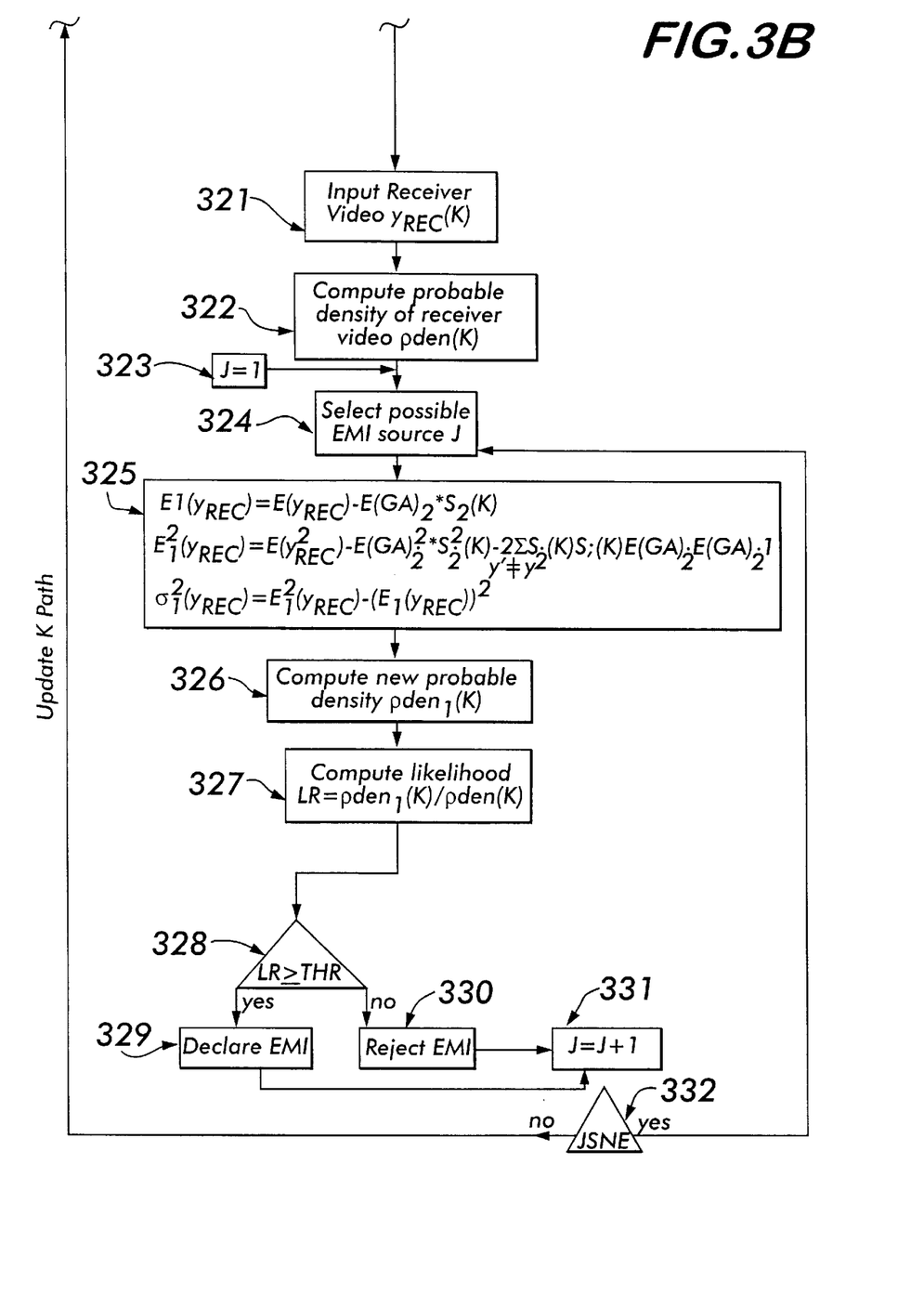

In more general terms, FIG. 3 illustrates the processing flow of the invention. Specifically, in FIG. 3, item 301 is the initialization of the sampling time loop, i.e., there are NSAM equally-spaced time points to be considered, and information is to be garnered at each such point in order to determine possible sources of electromagnetic interference (EMI) at the given times.

In item 302, initial parameters are introduced. They are assumed to be known at the outset and are therefore outside of any of the loop structures shown in the flow chart. These parameters are: (1) constants $q_1$ and $q_2$, both greater than 0, and representing the noise power of an emitter's X and Y velocity components, respectively (relative to a fiducial inertial reference system); (2) an initial estimation vector $\hat{X}(o|o), \hat{X}'(o,o), \hat{Y}(o|o), \hat{Y}'(o,o)$ for position and velocity; (3) T, the sampling time interval; (4) $\sigma_{w_1}^2$ and $\sigma_{w_2}^2$, which are measurement noise variances of X and Y emitter ship coordinates, respectively; (5) $\sigma_{w_3}^2$, the measurement noise variance of the emitter antenna orientation; (6) constant $q_3$, greater than zero, and representing the noise power of an emitter antenna's angular rotation rate; (7) $\sigma_n^2$, ambient noise power of the received signal; and (8) $\omega$, the receiver's angular rate, a, the receiver's aperture, $a_1$, the emitter's aperture, and $\lambda$, the emitter's wavelength.

In item 303, $\alpha$'s and $\beta$'s are determined, based on Equations (27a) and (27b) for i=1, 2, and 3.

In item 304, the time point is updated. From the initialization k=0, it is seen, for example, that the loop starts with k=1.

Item 305 is a decision block. If k exceeds the number of time sample points, namely NSAM, the program stops since all EMI sources have been obtained, recorded as a function of time.

The stop block is item 306. If k does not exceed NSAM, EMI sources, if any, are to be procured at time kT. The first step in determining possible EMI sources is that of obtaining tracking estimates. Item 307 represents this computation. Here, the r estimate is just ($\hat{X}(k|k)$, $\hat{Y}(k|k)$), as given by Equations (40) and (42), respectively, and the main lobe antenna estimate $\hat{\theta}(k|k)$ is given by Equation (46).

In item 308, the receiver gain G is computed, as given by Equations (16) and (37), using the known aperture a, the known wavelength $\lambda$, the known receiver's angular rate $\omega$, and the estimates $\hat{X}(k|k)$ and $\hat{Y}(k|k)$. This computation is valid for given selections of position errors $e_1(k)$ and $e_2(k)$ in X and Y, respectively.

In a similar fashion, in item 309, the emitter gain is obtained. However, in this case, a new quantity, namely, the offset angle $\theta_x$, appears. As mentioned previously, in lieu of further knowledge, the offset angle is to be treated as a uniformly distributed random variable over $(-\pi,\pi)$. The emitter gain is given by Equation 20, where use is made of Equation (44). Again, $\hat{X}(k|k)$ and $\hat{Y}(k|k)$ are needed, and $\hat{\theta}(k|k)$ is also needed, as afforded by Equation (46). Of course, values must be assigned to $e_1(k)$, $e_2(k)$, and $e_3(k)$, $e_3(k)$ being given in Equation (45).

In item 310, the two gains are multiplied together. The product represents the joint effect of two lobe patterns, one effect being due to energy transmitted toward the receiving ship and the other being due to the direction of the receiving antenna at the point in time when the information is registered.

Items 311, 312, and 313 are parallel to one another in that they all relate to calculation of an error Gaussian density, 311 being that for the X coordinate of the emitter, 312 being that for the Y coordinate of the emitter, and 313 being that for the main lobe of the emitter.

In order to compute expected values of the gain product and its squares, such quantities are needed. Therefore, block 314 represents multiplying together the above three densities. Item 315 illustrates the actual calculation of these expected values.

Computation of the mean and variance of the received signal is representable as a sum of the individual signals and ambient noise. To initiate the procedures, the basic signal waveform $s_n$ and its square $s_n^2$ are computed for all of the emitters, $1 \leq n \leq NE$ (number of emitters). Each emitter n has its own wavelength $\lambda_n$, of course, and so each gain G and each gain A has its own $\lambda_n$ associated with it.

Item 316 shows the input of $s_n$ and $s_n^2$, and item 317 shows the product of items 315 and 316. If item 317 is summed for I=1 and I=2 in turn, in the former instance (I=1), the model expected value of the signal received at time kT will be obtained. In the latter instance (I=2), a partial contribution to the mean of the square of the received signal at time kT is obtained. The effect of these calculations is given in item 318. In fact, for I=1, item 318 gives the result of Equation (50).

Item 319 continues the calculation of SUM(2) by adding the ambient noise power $r_n^2$, which was an input in item 302. In item 320, the expected value of the received signal is identified as SUM(1), and the expected value of its square is completed by adding the sum indicated. The result is that of Equation (53). Finally, the variance of the received video is obtained, in the usual way, as the difference of the above two quantities.

The video actually received from all emitters constitutes item 321 of the flow chart. If a Gaussian density for the received video is assumed, then it can now be computed, using items 320 and 321. That density is given by Equation (55), and item 322 shows the computation.

The statistical procedure for determining possible EMI sources is now initiated by setting J=1 as item 323. Item 324 identifies that value of J with a possible EMI source. To discover whether or not emitter J is an interference source, both the expected value of the received signal and its square must reflect that supposition. Thus, item 325 is a computation of both the mean and variance of a signal reduced by the effect of emitter J.

Item 326 is the calculation of a Gaussian probability of the reduced video, and the calculation parallels that of Equation (55). Using item 322 and item 326, item 327 forms the likelihood ratio LR, namely, the ratio of the two densities.

Now, if source J is really a dominant interferer, it is to be expected that $pden_1(k)$, the distribution for the reduced signal, would be substantially larger than that of the original signal, i.e., the revised distribution would be more concentrated and thus more peaked about its mean. Therefore, one compares LR with a threshold THR, dictated by a tolerable false alarm rate, say $\epsilon=0.05$ (see Equation (57)).

Item 328 is a decision block for this comparison. If LR exceeds or equals the threshold, EMI is declared for emitter J at time kT. If not, EMI is rejected for that emitter. That is the function of items 329 and 330. Regardless of whether or not EMI is asserted, one needs to check the next emitter for EMI, for certainly there can be more than one EMI source. Thus, item 331 increments by 1 the value of J so that the next emitter can be checked as a possible interferer. Of course, if there are no more sources to be observed at time kT, then the next time sample point k should be tested for EMI.

Item 332 is a decision block. When J exceeds the number of emitters, NE, one proceeds to item 304 to increment the time counter. If J does not exceed the number of emitters, one goes to item 324 to check the next possible EMI source at time kT.

Thus, the radar system control unit 105 receives information from each statistical unit regarding the inferred sources of interference and makes appropriate adjustments, such as changing the operating frequencies of different radar units, in order to eliminate any actual or potential interference.

The conventional systems eliminate direct interference among closely spaced radar units. The present invention goes beyond such conventional systems and prevents interference of a lower magnitude. Since the present invention performs a statistical analysis of a broader bandwidth of frequencies, it can detect interference from more distant radar emitters that are operating at very close frequencies. Therefore, the present invention eliminates interference even before it is noticed by the operator and eliminates interference generated by other emitters which is normally perceived as a lack of resolution or background noise instead of actual emitter produced interference.

While the invention has been described in terms of a single preferred embodiment, those skilled in the art will recognize that the invention can be practiced with modification within the spirit and scope of the appended claims.

What is claimed is:

1. A method for inferring sources of electromagnetic interference among a plurality of transceiver systems comprising steps of:

inferring characteristics of the plurality of transceiver systems;

determining relative positions of said transceiver systems;

forming a composite received signal model for said transceiver systems based on said relative positions and said characteristics; and computing an electromagnetic interference likelihood value for a transceiver system of said transceiver systems;

identifying whether said transceiver system is a source of electromagnetic interference by determining whether said electromagnetic interference likelihood value of said transceiver system exceeds a threshold value.

2. The method as in claim 1, wherein said step of forming a composite received signal model comprises a step of statistically analyzing said characteristics.

3. The method as in claim 1, wherein said transceiver system includes a plurality of emitters and said step of forming a composite received signal model comprises steps of:

predicting pointing directions of said emitters; and predicting rotation rates of said emitters.

4. The method as in claim 1, wherein said step of forming a composite received signal model is performed based on periodic updates of said characteristics.

5. A transceiver system comprising:

a plurality of transceivers; and a controller in communication with said transceivers, wherein, each of said transceivers comprises:

an emitter;

a receiver operatively connected to said emitter, a primary data path operatively connected to said receiver;

a secondary data path operatively connected to said receiver;

a statistical unit operatively connected to said secondary data path and said controller; and a display device operatively connected to said primary data path.

6. The transceiver system as in claim 5, wherein said controller determines relative positions of said transceivers, and said statistical unit:

infers characteristics of said transceivers;

forms a composite received signal model for all of said transceivers based on said relative positions and said characteristics; and computes an electromagnetic interference likelihood value for a transceiver of said transceivers;

identifies whether said transceiver is a source of electromagnetic interference by determining whether said electromagnetic interference likelihood value of said transceiver exceeds a threshold value.

7. The transceiver system as in claim 6, wherein said statistical unit statistically analyzes said characteristics.

8. The transceiver system as in claim 6, wherein said statistical unit predicts a pointing direction of said emitter of each of said transceivers and predicts rotation rates of said emitter of each of said transceivers.

9. The transceiver system as in claim 6, wherein said statistical unit determines said electromagnetic interference likelihood value based on periodic updates from said receiver.

10. A first transceiver operatively connected to a controller, said controller being in communication with at least one second transceiver, said first transceiver comprising:

an emitter;

a receiver operatively connected said emitter;

a primary data path operatively connected to said receiver;

a secondary data path operatively connected to said receiver;

a statistical unit operatively connected to said secondary data path and said controller; and a display device operatively connected to said primary data path.

11. The first transceiver as in claim 10, wherein said controller determines relative positions of said at least one second transceiver, and said statistical unit:

infers characteristics of said at least one second transceiver;

forms a composite received signal model for said at least one second transceiver based on said relative positions and said characteristics; and computes an electromagnetic interference likelihood value for said at least one second transceiver;

identifies whether said at least one second transceiver is a source of electromagnetic interference by determining whether said electromagnetic interference likelihood value of said at least one second transceiver exceeds a threshold value.

12. The first transceiver as in claim 11, wherein said statistical unit statistically analyzes said characteristics.

13. The first transceiver as in claim 11, wherein said at least one second transceiver includes a second emitter said statistical unit predicts a pointing direction and rotation rate of said second emitter.

14. The first transceiver as in claim 11, wherein said statistical unit determines said composite received signal model based on periodic updates from said receiver.

* * * * *

UNITED STATES PATENT AND TRADEMARK OFFICE
CERTIFICATE OF CORRECTION

PATENT NO.    : 6,043,770
DATED         : March 28, 2000
INVENTOR(S)   : Joseph P. Garcia and Edgar A. Cohen It is certified that error appears in the above-identified patent and that said Letters Patent is hereby corrected as shown below:

Drawings,
Sheet 2, FIG. 2; with regard to the grouping identified by reference number 201, "θ" should be -- $\theta_x$ -- and; with regard to the grouping identified by reference number 200, "$\theta_1$" should be -- $\theta_t$ --.
Sheet 3, FIG. 3A, with regard to the box identified by reference number 302, delete "Paramters" and insert -- Parameters --; with regard to the boxes identified by 311, 312 and 313 delete "$\rho_1, \rho_2$ and $\rho_3$" and insert -- $p_1, p_2$ and $p_3$ --; with regard to the box identified by reference number 315 before (GA)$^i$ insert -- $\int$ --; with regard to the box identified by reference number 316 delete "$S^2_{\Delta i}$" and insert -- $S^i_n$ --; with regard to the box identified by reference number 319 delete "$tr_n^2$" and insert -- $+\sigma_n^2$ --; with regard to the box identified by reference number 320 delete "$2\sum_{gif} s_2 s_2, E(GA))E(GA)_2$" and insert -- $2\sum_{jQ} s_j s_j, E(GA)_j E(GA)_j$ --; also delete "$0^2(y_{REC})$" and insert -- $\sigma^2(y_{REC})$ --; and finally delete " $(E(y^2_{REC}))^2$" and insert -- $(E(y_{REC}))^2$ --.
Sheet 4, FIG. 3B, with regard to the box identified by reference number 322, delete "ρden (K)" and insert -- pden (K) --; with regard to the box identified by reference number 325, delete the first two equations shown therein and insert the following two equations therefor -- $E_1(y_{REC}) = E(y_{REC}) - E(GA)_j * S_j(K)$ and $E_1^2(y_{REC}) = E(y^2_{REC})$
$- E(GA)^2_j * S_j^2(K) - 2 \sum_{j \neq j} sj(K)Sj'(K)E(GA)_j E(GA)_j$ --; with regard to the box identified by reference number 326 delete "$\rho den_1(K)$" and insert -- $pden_1(K)$ --; with regard to the box identified by reference number 327 delete "ρden, (K) /ρden(K)" and insert -- pden, (K) / p den (K) --; and finally with regard to the box identified by reference number 332 delete "JSNE" and insert -- $J \leq NE$ --.

Column 4,
Line 11, equation (1) delete (four times) "r" and insert -- r --;
Line 33, equation (1) (first term) after " (t) " insert -- k --;
Line 37, delete "$i_r$" and insert -- $i_{r1}$ --;
Line 67, delete, two occurrences, "r" and insert, two occurrences, -- r --, also delete "v" and insert -- v --.

Column 5,
Lines 3 and 24, equation (8), two occurrences, "$r_t$" and insert, two occurrences, -- $r_t$ --, also all V's should be replaced by v's wherever they occur in equation (8).
Line 7, delete "$\theta_t^{li}$" and insert -- $\theta'_t$ --;
Line 12, delete "$\ddot{\theta}_t$'" and insert -- $\ddot{\theta}_o$' --;

Line 67, delete "attempted" and insert -- attenuated --.

UNITED STATES PATENT AND TRADEMARK OFFICE
CERTIFICATE OF CORRECTION

PATENT NO. : 6,043,770
DATED : March 28, 2000
INVENTOR(S) : Joseph P. Garcia and Edgar A. Cohen It is certified that error appears in the above-identified patent and that said Letters Patent is hereby corrected as shown below:

Column 6,
Line 11, delete "$\|r_t\|$" and insert -- $\|\mathbf{r}_t\|$ --;
Line 22, delete "use din" and insert -- used in --;
Line 25, delete "fight" and insert -- right --;
Line 47, delete "lightly" and insert -- slightly --.

Column 7,
Line 14, delete "coordinate" and insert -- coordinates --;
Line 16, delete "r(t)" and insert -- r(t) --;
Line 22, equation (22), delete, two occurrences, "s" and insert, two occurrences -- s --;
Line 33, delete existing expression and insert -- $s(t) = (X(t), \dot{X}(t), Y(t), \dot{Y}(t))$ --;
Line 35, delete "v" and insert -- v --;
Line 46, delete existing expression starting with E and insert -- E (v (k) v´ (j) ) = $Q\delta_{kj}$ --;
Line 53, equation (25) delete the terms "z,s and w" and insert -- z, s and w --:
Lines 63, 64 and 65, delete existing expression and insert --

$$E(\mathbf{w}(k)\mathbf{w}'(j)) = \begin{pmatrix} \sigma_{wi}^2 & 0 \\ 0 & \sigma_{w2}^2 \end{pmatrix}\delta_{kj}$$

-- .

Column 8,
Lines 3-8, equation (26) delete "s's and z's" and replace therewith -- s's and z's --;
Line 14, delete " $\sigma_{wt}^2$ " and insert -- $\sigma_{wi}^2$ --;

Line 38, after "utilized" insert -- : --:
Line 41, equation (29) delete the s's and the v and insert -- s's and v --;
Line 48, delete existing expression and v$_1$ (K) and insert -- s$_1$ (t) = ($\theta$(t) , $\omega$ (t) ) ' and v, (k) --;
Line 59, equation (32) delete existing expression and insert -- z$_3$ (k) = H$_1$s$_1$ (k) +w$_3$ (k) --;
Line 61, delete "w$_1$ (k) " and insert -- w$_3$ (k) --.

Column 9,
Line 4, delete "s" and insert -- s --;
Line 5, delete existing expression and insert -- ($\theta$* (t) , $\omega$ (t) )´ --;
Line 6, delete "s" and insert -- s --;
Line 20, delete the "s's" and insert -- s's --;
Line 30, the word "where" should be left adjusted in the column.

UNITED STATES PATENT AND TRADEMARK OFFICE
CERTIFICATE OF CORRECTION

PATENT NO. : 6,043,770
DATED : March 28, 2000
INVENTOR(S) : Joseph P. Garcia and Edgar A. Cohen It is certified that error appears in the above-identified patent and that said Letters Patent is hereby corrected as shown below:

Column 10,
Line 43, equation (48) delete "($z_3$" and insert -- ($z_3$) --.

Column 11,
Line 42, delete "square, having" and insert -- square. Having --;
Line 66, delete "$pden_i$ (kT)" and insert -- $pden_1$ (kT) --.

Column 13,
Line 55, delete "I-2" and insert -- I=2 --;
Line 64, delete "$r_n^2$" and insert -- $\sigma_n^2$ --.

Signed and Sealed this

Ninth Day of July, 2002

*Attest:*

*Attesting Officer*

JAMES E. ROGAN
*Director of the United States Patent and Trademark Office*